(12) United States Patent
Duncan et al.

(10) Patent No.: US 11,518,931 B2
(45) Date of Patent: Dec. 6, 2022

(54) METHOD OF MITIGATING FRAC HIT PRODUCTION INTERFERENCE FROM ADJACENT OIL WELLS USING TREATMENT FLUIDS WITH NANOPARTICLES

(71) Applicant: Nissan Chemical America Corporation, Houston, TX (US)

(72) Inventors: Joshua Edward Duncan, Abilene, TX (US); Juergen M. Lukas, Mineral Wells, TX (US); James Christian Dale Rankin, Tuscola, TX (US); John Edmond Southwell, Glenn Ellyn, IL (US); Edwin Ray Templeton, Abilene, TX (US)

(73) Assignee: Nissan Chemical America Corporation, Houston, TX (US)

( * ) Notice: Subject to any disclaimer, the term of this patent is extended or adjusted under 35 U.S.C. 154(b) by 0 days.

(21) Appl. No.: 17/428,115

(22) PCT Filed: Jan. 29, 2020

(86) PCT No.: PCT/US2020/015603
§ 371 (c)(1),
(2) Date: Aug. 3, 2021

(87) PCT Pub. No.: WO2020/163134
PCT Pub. Date: Aug. 13, 2020

(65) Prior Publication Data
US 2022/0135871 A1     May 5, 2022

Related U.S. Application Data

(60) Provisional application No. 62/941,957, filed on Nov. 29, 2019, provisional application No. 62/800,699, filed on Feb. 4, 2019.

(51) Int. Cl.
*C09K 8/70* (2006.01)
*E21B 43/17* (2006.01)
(Continued)

(52) U.S. Cl.
CPC .............. *C09K 8/706* (2013.01); *E21B 43/17* (2013.01); *E21B 43/261* (2013.01); *E21B 43/267* (2013.01); *C09K 2208/10* (2013.01)

(58) Field of Classification Search
CPC .... C09K 2208/10; C09K 8/032; C09K 8/426; C09K 8/665; C09K 8/035; C09K 8/80;
(Continued)

(56) References Cited

U.S. PATENT DOCUMENTS

| | | |
|---|---|---|
| 9,790,775 B2 | 10/2017 | Joseph et al. |
| 2012/0175120 A1 | 7/2012 | Holcomb et al. |

(Continued)

FOREIGN PATENT DOCUMENTS

| | | | | |
|---|---|---|---|---|
| CA | 2827559 A1 * | 8/2012 | ............. | C02F 3/108 |
| CA | 3058470 A1 * | 10/2018 | ............... | C09K 8/03 |

(Continued)

OTHER PUBLICATIONS

International Search Report and Written Opinion for corresponding application No. PCT/US2020/015603, dated May 29, 2020.

*Primary Examiner* — Zakiya W Bates
(74) *Attorney, Agent, or Firm* — Nixon & Vanderhye, PC

(57) ABSTRACT

A method for minimizing the creation and existence of frac hits in an oil field comprising the step of pumping treatment fluids into the Parent well before performing the frac on the Child well wherein the treatment fluids contain brine resistant silica nanoparticles is described and claimed.

9 Claims, 7 Drawing Sheets

(51) Int. Cl.
  *E21B 43/26* (2006.01)
  *E21B 43/267* (2006.01)

(58) Field of Classification Search
  CPC ........ E21B 43/26; E21B 21/003; E21B 43/16;
  E21B 43/267
  See application file for complete search history.

(56) References Cited

U.S. PATENT DOCUMENTS

| | | |
|---|---|---|
| 2018/0100383 A1 | 4/2018 | Saponja et al. |
| 2018/0291255 A1 | 10/2018 | Southwell |
| 2019/0093462 A1 | 3/2019 | Watts et al. |
| 2019/0136119 A1 | 5/2019 | Aslam et al. |
| 2019/0136123 A1 | 5/2019 | Holcomb et al. |

FOREIGN PATENT DOCUMENTS

| | | |
|---|---|---|
| WO | 2018089019 A1 | 5/2018 |
| WO | 2021150650 A1 | 7/2021 |

\* cited by examiner

METHOD OF MITIGATING FRAC HIT PRODUCTION INTERFERENCE FROM ADJACENT OIL WELLS USING TREATMENT FLUIDS WITH NANOPARTICLES

FIELD OF THE INVENTION

This invention is in the field of methods of improving the recovery of oil from underperforming oil wells.

BACKGROUND OF THE INVENTION

"Frac Hits" is a term describing a phenomenon wherein an adjacent/offset "Child" oil well is located nearby to an initial oil well (Parent well) and the fractured zone of the Child well intersects or communicates with the fractured zone of the Parent well. This intersection is undesirable, as negative influence can occur by fines migration, proppant, or fluid pressure communication from the Offset/Child frac zone to the Parent frac zone or sometimes vice-versa.

When the Offset/Child well is fractured and propped using conventional hydraulic fracturing techniques frequently the well operator can notice interference or a decrease in production in the Parent well.

From "Understanding the 'frac-hits' impact on a Midland basin tight-oil well production" by Sun, Hao; Zhou, Dengen; Chawathé, Adwait; and Liang, Baosheng, jointly published by Chevron Energy Technology Company and Chevron North America Exploration and Production Company, Houston, Tex. 77002, United States)

This paper was prepared for presentation at the Unconventional Resources Technology Conference held in Austin, Tex., USA, 24-26 Jul. 2017, Copyright 2017, Unconventional Resources Technology Conference (URTeC) DOI 10.15530/urtec-2017-2662893:

"'Frac-hits' are defined as the invasion of fracturing fluids into an existing producer (parent well) while a neighboring well (Child well) is being fractured. Data from wells that experienced 'frac-hits' suggest that substantial amount of fracturing fluids from offset wells may invade the existing producers, indicating high degree of connectivity between the existing producer and the newly stimulated well. Even if the parent well is shut-on during the fracturing of the Child well, oil rates after re-starting the parent well production were observed to be lower than that prior to shut-in, and the oil production trend line deviates (usually lower) from the original type curve production."

Put in other words: "Frac hits are defined as the invasion of fracturing fluids into an existing producer, usually a parent well, while a neighboring well, usually the Child well, is being fractured. This interference could have two negative impacts: it often creates Child wells that only reach 60% or less production performance compared to parent well, and a frac hit to the parent well can decrease its production after frac the Child well(s). the offset wells are fractured, the water production of parent well increases, while oil production decreases, and does not recover. Numerous reasons cause this parent-Child interference including stress reversal, Child well fractures tending to grow towards the parent well, and improper parent-Child well spacing. The longer the parent well has been on production, the higher the likelihood of an induced stress change, resulting in a higher probability of well interference."

"Fighting Water with Water: How Engineers are Turning the Tides on Frac Hits", was published in the Journal of Petroleum Engineering on 1 Dec. 2018. This article describes a technique known as "active well defense". Active well design is designed to prevent temporary, yet costly, production stoppages caused by unabated frac hits filling parent wells with sand. The process is started by injecting produced water at low pressures into older, parent wells. It flows down miles of wellbore and into the formation's partially depleted fracture networks where it has proven to prevent the damage often caused by high-pressure hydraulic fracturing of new Child wells-known as frac hits.

"Brine Resistant Silica Sol", published as US Published Patent Application US 2018/0291255 A1 on Oct. 11, 2018 and is assigned to Nissan Chemical America. In this published patent application, a brine resistant silica sol is described and claimed. This brine resistant silica sol comprises an aqueous colloidal silica mixture that has been surface functionalized with at least one moiety selected from the group consisting of a monomeric hydrophilic organosilane, a mixture of monomeric hydrophilic organosilane(s) and monomeric hydrophobic organosilane(s), or a polysiloxane oligomer, wherein the surface functionalized brine resistant aqueous colloidal silica sol passes at least two of three of these brine resistant tests: API Brine Visual, 24 Hour Seawater Visual and API Turbidity Meter.

"Use of Surface-Modified Nanoparticles for Oil Recovery", issued as U.S. Pat. No. 7,033,975 B2 on Apr. 25, 2006 to 3M Innovative Properties Company. In this issued patent, the claimed invention provides the use of surface-modified nanoparticles in fluids used to recover hydrocarbon from underground formations. The use of surface-modified nanoparticles in such fluids provides foams that are stable under pressure yet have a shorter foam lifetime than typical surfactant-stabilized foams after the pressure is released or lowered.

"Tight Formation Water Shut Off Method with Silica Gel", issued as U.S. Pat. No. 7,458,424 B2 on Dec. 2, 2008 to Schlumberger Technology Corporation. This issued patent describes and claims a delayed gelling system useful in conformance control in the production of petroleum from subterranean formations, especially low permeability formations, is disclosed. The gelling system comprises a basic silica sol, an activator comprising a hydroxyl donor, and an optional syneresis inhibitor. In the disclosed method of using the gelling system, the gelling system may be pumped into formations with excessive water and/or gas production and thermally activated in the formation at downhole conditions to form a hard gel to reduce water and/or gas production.

"Using Colloidal Silica as a Zonal Isolation Material and Fast Path Blocker in Geological Formations" published as US Published Patent Application US 2018/0208826 A1 on Jul. 26, 2018 to Lawrence Livermore National Security, LLC. This patent application describes and claims a system for blocking fast flow paths in geological formations includes preparing a solution of colloidal silica having a nonviscous phase and a solid gel phase. The solution of colloidal silica is injected into the geological formations while the solution of colloidal silica is in the nonviscous phase. The solution of colloidal silica is directed into the fast flow paths and reaches the solid gel phase in the fast flow paths thereby blocking flow of fluid in the fast paths.

"Method for Treating a Hydraulically Fractured Wellbore", published on Nov. 1, 2018 as US Published Patent Application US 2018/0313199 A1 and is assigned to NewWell Tech, LLC. This published patent application describes and claims a methodology and compositions for re-fracturing a wellbore. By differentiating existing perforations that have been fractured from those that are not, applying a sealing composition to seal off the identified, fractured perforations, and performing re-fracturing to perforations that are not sealed, a wellbore can be re-fractured effectively and efficiently. The present invention for re-fracturing a wellbore has broad applications in the field of hydraulic fracturing.

"Methods of Controlling Well Bashing", published on Apr. 6, 2017 as PCT Publication No. WO 2017/058245 A1 and is assigned to Halliburton Energy Services Inc. In this published PCT patent application, methods of preventing or minimizing communication between adjacent wells are described and claimed. The methods include providing a pre-pad fluid, pad fluid, and/or slurry including a material, introducing the pre-pad fluid, pad fluid, and/or slurry and material into a first well adjacent a second well, allowing the material to block fractures in the first well to prevent or minimize communication between the first well and the second well, stimulating the second well after blocking the fractures, and recovering a formation fluid from the first well, the second well, or both. The material includes one or more of a conformance chemical, diverting agent, or a combination thereof.

As development of unconventional reservoirs continues with tighter and tighter well spacing, some of the current production and subsequent reserves of the initial well are often compromised. In many cases, the initial well consists of large, permeable fracture networks connecting to much tighter matrix reservoir rock. By the time the infill well is drilled, the initial well in the spacing unit may have already produced several hundred thousand barrels of fluid. This depletion often creates a lower-stress environment around the induced fractures of the parent well—in other words, a pressure sink may form predominantly in the fracture network. As an infill well is drilled and completed, the initial well will become more vulnerable to an intersection from a nearby propagating fracture leading to severe production losses. In addition, fracture fluid and proppant communication may occur between the neighboring wells, also leading to an ineffective stimulation of the infill well. As the name—frac hit—suggests, a powerful force is unleashed that can also result in severe damage to production tubing, casing, and well heads.

It has been reported that infill wells often demonstrate production performance of only 60% or less when compared to the existing initial well. Initial well interference can include undesirable increases in water production, as well as oil production decreases that frequently do not return to their previous levels. Numerous causes have been cited, including stress reversal, tendency of infill well fractures to grow toward initial well fracture networks, and improper initial-infill well spacing. It has also been reported that the longer the initial well has been on production, the higher the likelihood of an induced stress change, resulting in a higher probability of infill well interference. Negative influences can be seen in the form of fines migration, proppant migration, or fluid pressure communication between the infill well frac zone to the initial well frac zone, and vice-versa.

With intense business demands to cut costs and increase production, hydraulic fracture interference or frac hits is an increasing problem in today's more mature unconventional fields. Operators must develop strategies to combat production losses caused by frac hits.

Refracturing has often been explored as a potential solution, however there are limitations when it comes to the cost-effectiveness of this process. A more economic strategy employed is re-pressurizing the initial well prior to fracturing the infill well. Re-pressurizing the initial well consists of using a fluid or gas to fill the depleted fractures and the voided pore spaces around these fractures. While the pressurization effect is temporary, as an offset well is fractured nearby, the temporary higher-stress environment near the initial well fractures works to prevent well-to-well fracture interaction—protecting the initial well's productivity.

SUMMARY OF THE INVENTION

In an embodiment the instant claimed invention is a method for minimizing the creation and existence of frac hits in an oil field comprising the step of pumping treatment fluids into the Parent well before performing the frac on the Child well wherein the treatment fluid comprises nanoparticles.

In an embodiment the instant claimed invention is a method for minimizing the creation and existence of frac hits in an oil field comprising the step of pumping treatment fluids into the Parent well before performing the frac on the Child well wherein the treatment fluid comprises colloidal silica nanoparticles.

In an embodiment the instant claimed invention is a method for minimizing the creation and existence of frac hits in an oil field comprising the step of pumping treatment fluids into the Parent well before performing the frac on the Child well wherein the treatment fluid comprises brine resistant colloidal silica nanoparticles.

In an embodiment the instant claimed invention is a method for minimizing the creation and existence of frac hits in an oil field comprising the step of pumping treatment fluids into the Parent well before performing the frac on the Child well wherein the treatment fluid comprises brine resistant colloidal silica nanoparticles and surfactants and optionally one or more terpenes.

In an embodiment the instant claimed invention is a method for minimizing the creation and existence of frac hits in an oil field comprising the step of pumping treatment fluids into the Parent well before performing the frac on the Child well wherein the treatment fluid comprises less than about 0.1 wt. % nanoparticles.

DETAILED DESCRIPTION OF THE INVENTION

Figure 1:
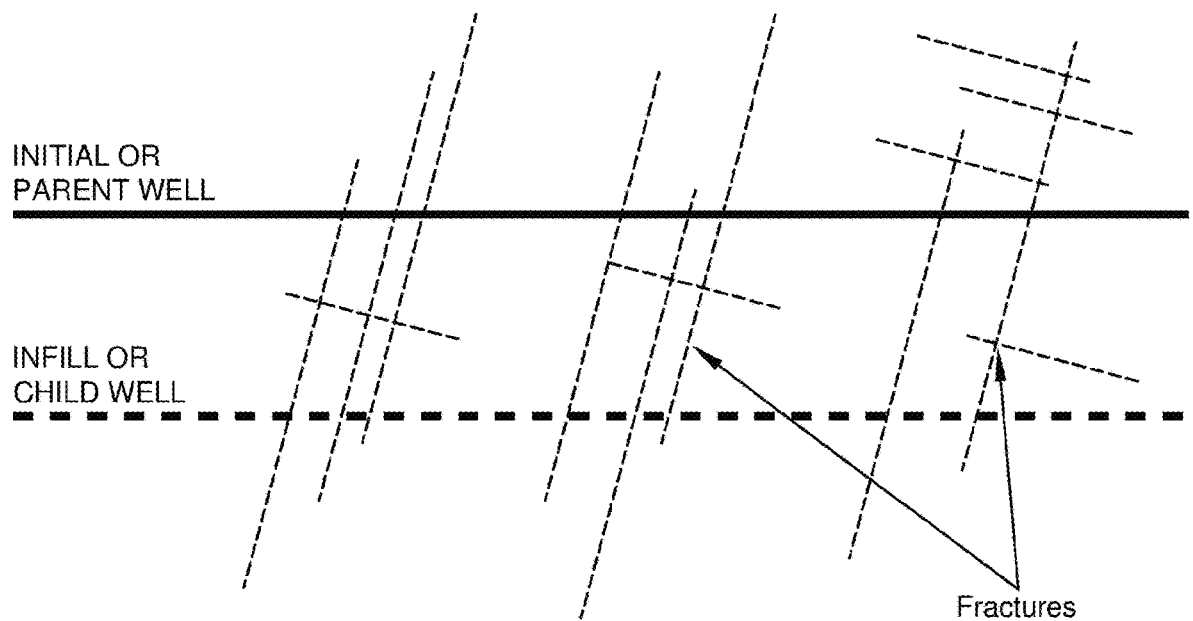
FIG. 1: A typical spacing unit of 1280 acres is represented. The solid black line is an existing well and the black dashed line in a new well drilled and being prepped for initial fracture stimulation. The smaller hatched lines represent fractures in the unconventional reservoir rock.
Figure 2:
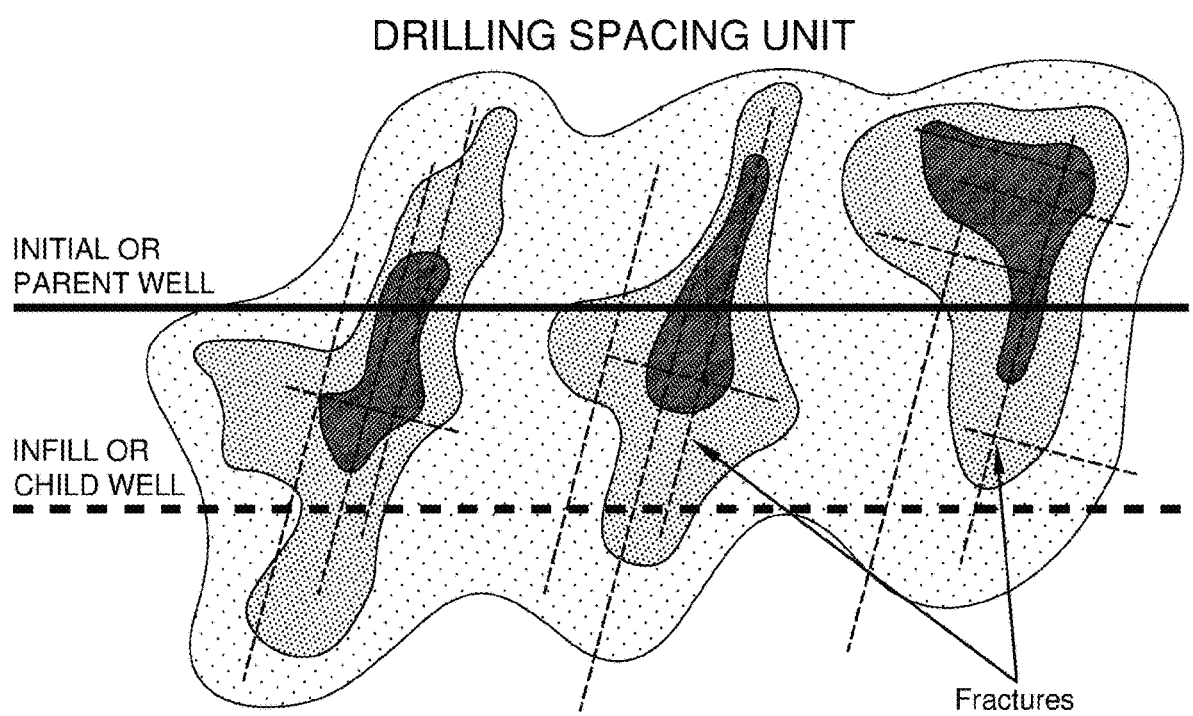
FIG. 2: Provided the initial well has produced 250,000 reservoir barrels of total fluid, the dark color represents pressure depletion associated with drainage along the fractures.
Figure 3:
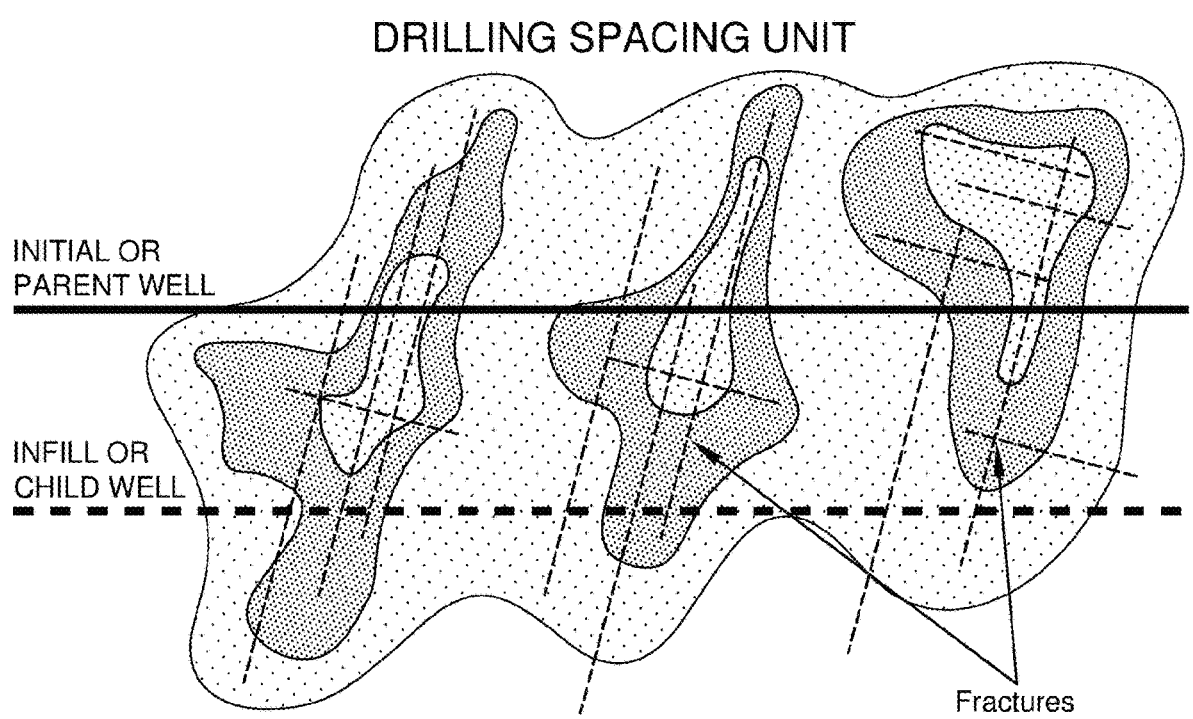
FIG. 3: To mitigate effect of the drainage of the initial well, both on the fracture efficacy on the new well and on the continued production of the initial well, water is injected into the original or initial wellbore. The water fills the high perm fractures reducing the effects of drainage.
Figure 4:
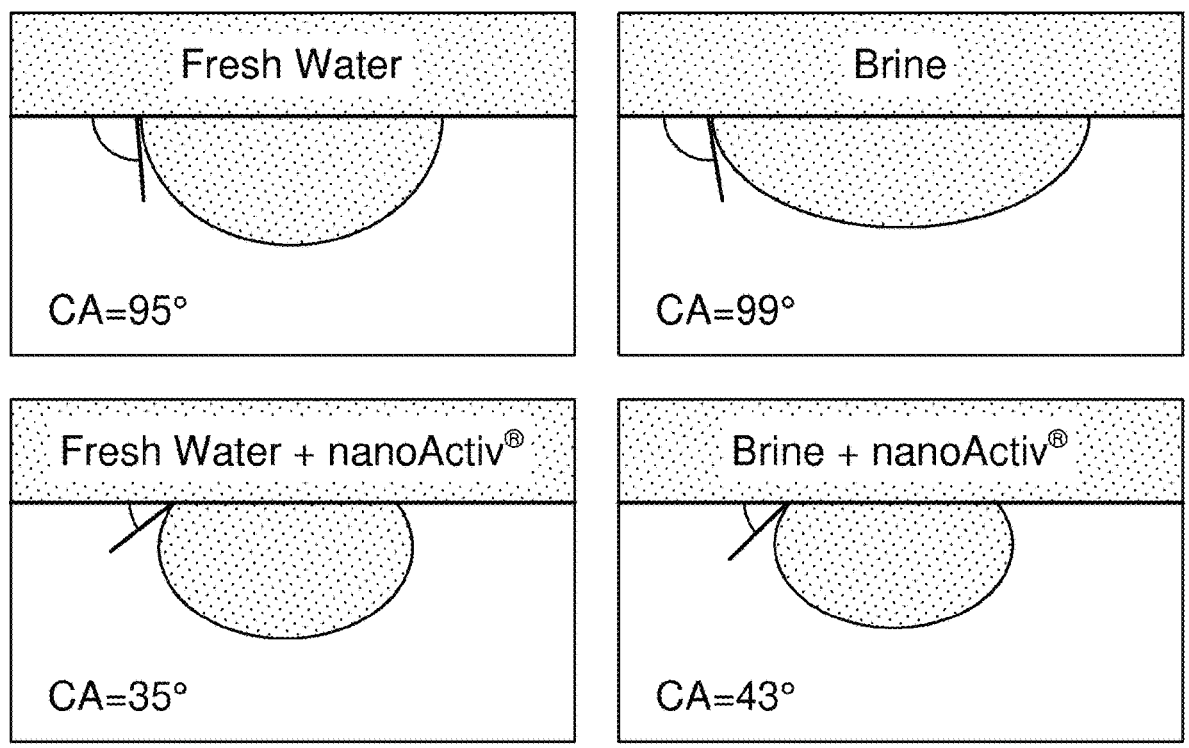
FIG. 4: Oil Droplets equilibrated on the oil saturated Montney cores immersed in fresh water, reservoir brine, fresh water and nanoActiv® and brine and nanoActiv® respectively. Contact Angle (CA) of Oil Droplets on surface of oil saturated core surfaces are shown to be altered (wettability alteration) by addition of nanoActiv® fluids comprising silica nanoparticles.
Figure 5:
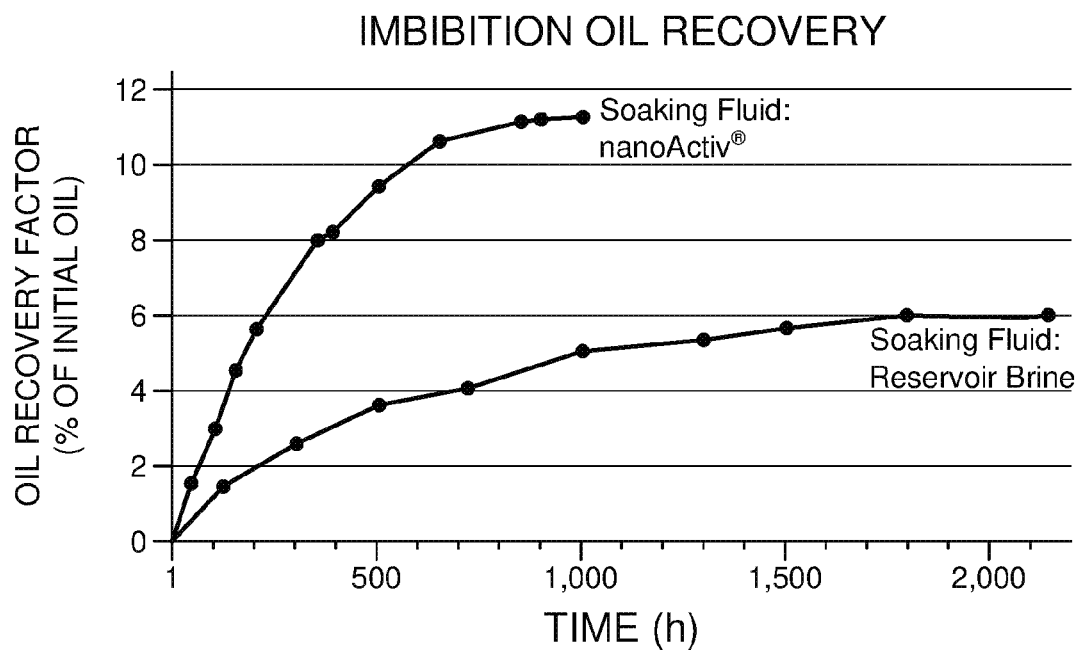
FIG. 5: Shows Imbibition Oil Recovery by plotting Oil Recovery Factor (as % of Initial Oil) vs. time (in hours). This figure shows the results of testing on twin core plugs with one plug immersed in a brine solution and one plug immersed in a nanoActiv® solution comprising silica nanoparticles. Imbibition is the process of absorbing a wetting phase into a porous rock. Imbibition is important in a waterdrive reservoir because it can advance or hinder water movement, affecting areal sweep. Imbibition has long been recognized as an important factor in recovering oil from water-wet, fractured-matrix reservoirs subjected to water flood or water drive.

Frac hits are costing operators billions of dollars in lost production. This new treatment method mitigates the effects of frac hits and increases production in initial as well as infill wells. This treatment method uses fluid in combination with highly surface-modified nanoparticles. The combination provides a temporary high-stress fracture environment in the initial well to prevent neighboring fracture interactions using the fluid. The highly surface-modified nanoparticles act to reduce interfacial tension, modify wettability, and disjoin and fragment hydrocarbons to create a favorable fluid-flow environment to enable increased and sustained production. The diffusion-driven tendency of properly designed nanoparticles to disjoin/dislodge entrenched/adhered oil & gas from rock surfaces via disjoining pressure and the wedge effect is used to carry hydrocarbons from one frac zone to the next. Fines damage can be mitigated via nanoparticle attachment and isolation preventing fracture or pore blocking.

The tendency of nanoparticle dispersions to diffuse from areas of high concentration to low concentration is utilized by the method of:
(a) Prior to fracturing and injection of pad/prop stages of Offset/Child well pump into Parent well fluids comprising nanoparticles.
(b) Perforate and Fracture Child well adjacent to Parent well. It is believed that the presence of nanoparticles in the Parent well fracture zone periphery can facilitate a reduction in induced water production due to Child well communication and interference along with an additional increase in hydrocarbon recovery in the Parent well, the Child well, or both due to the presence of nanoparticles in the Parent frac zone.

Treatment Fluids Useful in this Invention
Treatment Fluids comprise
(i) Surfactants;
(ii) Nanoparticles;
(iii) Colloidal Silica Nanoparticles;
(iv) Brine Resistant Colloidal Silica Nanoparticles; and/or
(v) Brine Resistant Colloidal Silica Nanoparticles in combination with surfactants and optionally terpene.

Nanoparticles:
A broad description of nanoparticles suitable for use in the treatment fluids used in the methods of the instant claimed invention include inorganic nanoparticles (with accompanying list of suitable embodiments), surface-modified inorganic nanoparticles, organic acid and base surface modification agents for non-silica inorganic nanoparticles, microemulsions, and microemulsions comprising nanoparticles/surface-modified nanoparticles.

The present invention provides the use of nanoparticles or surface-modified nanoparticles to reduce frac hit production interference in oil or hydrocarbon recovery. In certain oil or hydrocarbon recovery methods nanoparticles or surface-modified nanoparticles can act synergistically with surfactant or replace surfactant in reducing interfacial tension between oil or hydrocarbons and aqueous systems. Nanoparticles or surface-modified nanoparticles can also act to remove oil and hydrocarbons from rock surfaces via increased disjoining pressure at the 3-phase contact angle between oil/hydrocarbon—water/brine—rock (for example shale). One skilled in the art can choose an appropriate nanoparticle system or surface-modified nanoparticle system to reduce surface tension of a desired fluid. One skilled in the art can also choose such a nanoparticle system to improve wettability of a target hydrocarbon-bearing formation.

In methods where Frac-Hit mitigation strategies are employed it is advantageous to preload a parent well with fluids comprising nanoparticles or surface-modified nanoparticles to take advantage of their tendency to improve oil and hydrocarbon removal for the aforementioned reasons.

The nanoparticle or surface-modified nanoparticle fluids are preferably individual, unassociated (i.e. unagglomerated) nanoparticles dispersed throughout the dispersing liquid and preferably do not irreversibly associate with each other. The term "associate with" or "associating with" includes, for example, covalent bonding, hydrogen bonding, electrostatic attraction, London forces and Hydrophobic interactions.

Nanoparticles of interest can be chosen from the following groups: polymers, microemulsions of dispersed liquids, or inorganic particles. Preferably the nanoparticles are inorganic or microemulsions of dispersed liquids. Examples of suitable inorganic nanoparticles include colloidal Silica and metal oxide nanoparticles including Zirconia, Titania, Ceria, Alumina or oxides of Aluminum, Iron oxide, Vanadia, oxides of Antimony, oxides of Tin, oxides of Zinc.

In a further embodiment, combinations of inorganic oxides can also be used to make combination nanoparticles such as Alumina modified colloidal Silica, Calcium oxide modified colloidal Silica, Lithium oxide modified colloidal Silica, Iron oxide modified colloidal Silica, Magnesium oxide modified colloidal Silica, and similar colloidal Silica systems modified with oxides of non-silica inorganic oxides.

Suitable colloidal Silica modified with non-silica inorganic oxides include, but are not limited to, the product families of Snowtex ST-AK products and ST-C available from Nissan Chemical Corporation.

Other suitable mixed oxide systems include NanoUse® HT, NanoUse® HZ, NanoUse® HX, or NanoUse® ZR product families which are colloidal oxide mixtures of Silica, Tin, Zirconia, Titania along with other additive inorganic oxides available from Nissan Chemical Corporation, Japan 5-1, Nihonbashi 2-Chome Chuo-Ku, Tokyo, Japan.

Other suitable colloidal silicas include the Snowtex® product family available from Nissan Chemical Corporation. This family includes, for example, Snowtex® ST-O, Snowtex® ST-O40, Snowtex® ST-OS, Snowtex® ST-OXS, Snowtex® ST-N, Snowtex® ST-30, Snowtex® ST-S and Snowtex® ST-XS. The nanoparticles have an average particle diameter less than about 100 nm, in an embodiment less than about 50 nm, and in another embodiment less than about 30 nm. The nanoparticles have an average particle diameter greater than about 3 nm. If the nanoparticles are aggregated, the maximum cross-sectional dimension of the aggregated particle is within any of these preferably ranges. Useful surface-modified zirconia nanoparticles include a combination of oleic acid and acrylic acid adsorbed onto the surface of the particle.

Inorganic nanoparticle fluids can, in a further embodiment, comprise surface-treated nanoparticles. Suitable classes of surface modifying agents include for example organosilanes, organic acids, organic bases, and alcohols. Particularly useful surface modifying agents include organosilanes. Organosilanes, include, but are not limited to, alkylchlorosilanes, alkoxysilanes (e.g. methyltrimethoxysilane, methyltriethoxysilane, ethyltrimethoxysilane, methyltriethoxysilane, n-propyltrimethoxysilane, n-propyltriethoxysilane, isopropyltrimethoxysilane, isopropyltriethoxysilane, butyltrimethoxysilane, butyltriethoxysilane, hexyltrimethoxysilane, octyltrimethoxysilane, 3-mercaptopropyltrimethoxysilane, phenyltrimethoxysilane, glycidoxypropyltrimethoxysilane, methacryloxypropyltrimethoxysilane, methacryloxypropyltriethoxysilane, 3-ethyl-3-oxetanyloxymethylpropyltrimethoxysilane, vinyltrimethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltriphenoxysilane, vinyltri(t-butoxy)silane, vinyltris (isobutoxy)silane, vinyltris(isopropenoxy)silane, vinyltris (2-methoxyethoxy)silane, (3-triethoxysilyl)propylsuccinic anhydride, trialkoxyarylsilanes, isooctyltrimethoxysilane, N-(3-triethoxysilylpropyl)methoxyethoxy ethyl carbamate, N-(3triethoxysilylpropyl)methoxyethoxyethoxyethyl carbamate, ureidopropyltrimethoxysilane, 3-acryloyloxypropyltrimethoxysilane; polydialkylsilanes including polydimethylsiloxane; arylsilanes including for example substituted and unsusbstituted arylsilanes; alkylsilanes including for example substituted and unsubstituted alkylsilanes including for examples methoxy and hydroxyl substituted alkylsilanes, and combinations thereof.

Methods of surface modifying silica nanoparticles using silane functional agents can be found in US Published Patent Application 2018 0291255.

Useful organic acid surface modifying agents include for example, oxyacids of carbon (e.g. carboxylic acid), sulfur, and phosphorous, and combinations thereof.

Suitable polar surface-modifying agents having carboxylic acid functionality include but are not limited to $CH_3O$ $(CH_2CH_2O)CH_2COOH$ and 2-(2-methoxyethoxy)acetic acid and mono(polyethylene glycol)succinate.

Suitable nonpolar surface-modifying agents having carboxylic acid functionality include but are not limited to octanoic acid, dodecanoic acid, and oleic acid.

Suitable phosphorous containing acids include but are not limited to phosphoric acids, including for example octylphosphonic acid, laurylphosphonic acid, decylphosphonic acid, dodecylphosphonic acid, and octadecylphosphonic acid.

Useful organic base surface-modifying agents include but are not limited to, for example, alkylamines including for example octylamine, decylamine, dedecylamine, octadecylamine, diidopropylamine, tributylamine, and triamylamine.

Other useful non-silane surface-modifying agents include but are not limited to acrylic acid, methacrylic acid, beta-carboxyethylacrylate, mono-2-(meth-acryloyloxyethyl)succinate, and combinations thereof. A useful surface-modifying agent that imparts both polar character and reactivity to nanoparticle surfaces is mono(methacryloyloxypolyethyleneglycol) succinate.

Suitable surface-modifying alcohols include, for examples, aliphatic alcohols. Aliphatic alcohols include, but are not limited to, octadecyl, dodecyl, lauryl, and fufuryl alcohols, alicyclic alcohols including for example cyclohexanol, and aromatic alcohols including for examples phenol and benzyl alcohol, and combinations thereof.

A variety of methods are available for modifying the surface of nanoparticles, including for example adding a surface-modifying agent to nanoparticles (e.g. in the form of a powder or colloidal dispersion) and allowing the surface-modifying agent to react with the nanoparticles. Other useful surface modification processes are described in, for example, U.S. Pat. No. 2,801,185 (Iler) and U.S. Pat. No. 4,522,958 (Das et al.) and incorporated by reference herein.

Treatment Fluids and Well Design
Well Design:

Any technology and concentration recommendations made for the purposes of treating a well will take many different parameters into account. The key parameters that are most important to the well design include, but are not limited to: the total dissolved solids in the formation water, BHT (bottomhole temperature), API Oil Gravity, the wettability of the formation, porosity, permeability, pore size distribution, net pay/thickness, the initial and current BHP (bottomhole pressure), and the initial production and decline rate of the well. Once all the well parameters are considered, a type/grade and concentration of nanoparticles is recommended to be incorporated into the preload water, to be injected either as slugs, or as a continuous injection. Taking these parameters into account will also ensure that the nanoparticles stay stable (do not agglomerate) in the reservoir, do not cause any formation damage, and are able to effectively recover hydrocarbons via wettability alteration, IFT reduction and mechanical disjoining pressure.

Embodiments of nanoparticle fluids comprised of microemulsions suitable for the methods described in this invention include oil in water microemulsions comprising oil phase, cosolvent phase, surfactant or combination of surfactants, and an aqueous continuous phase. In a further embodiment the microemulsion fluid can comprise nanoparticles. Processes for preparing microemulsions comprising surface-modified nanoparticles are included in "Methods and compositions comprising particles for use in oil and/or gas wells", U.S. patent application Ser. No. 14/801,805, published as US 2016/0017204 and incorporated herein by reference.

Microemulsions:

An emulsion is a dispersion of droplets of one liquid in a second immiscible liquid. The droplets are termed the dispersed phase, while the second liquid is the continuous phase. To stabilize an emulsion, a surfactant or co☐surfactant is added such that the droplets remain dispersed and do not separate out as two phases.

Depending on the phase, there are two types of microemulsions: water☐in☐oil (w/o) and oil☐in☐water (o/w). As the name implies, water is the dispersed phase in w/o emulsions, whereas oil is the dispersed phase in o/w emulsions. One of the main differences between macroemulsions and microemulsions is that the size of the droplets of the dispersed phase of microemulsions is between 5 and 100 nm, while that of macroemulsions is >100 nm. Microemulsions are thermodynamically stable systems, whereas macroemulsions are kinetically stable systems. Also, microemulsions are translucent and of low viscosity, while macroemulsions are opaque and of relatively high viscosity. Due to these unique properties of microemulsions, these systems have become indispensable in numerous important fields. Reference: https: at www.intechopen.com/books/properties-and-uses-of-microemulsions/introductory-chapter-microemulsions. A well-known classification of microemulsions is that of Winsor who identified (see HYDROTROPY, SOLUBILISATION AND RELATED EMULSIFICATION PROCESSES. PART I. BY P. A. WINSOR., Trans. Faraday Soc., 1948, 44, 376-398 Received 13Jan. 1947 as revised 5th Jun., 1947.)

four general types of phase equilibria:
- Type I: the surfactant is preferentially soluble in water and oil-in-water (o/w) microemulsions form (Winsor I). The surfactant-rich water phase coexists with the oil phase where surfactant is only present as monomers at small concentration.
- Type II: the surfactant is mainly in the oil phase and water-in-oil (w/o) microemulsions form. The surfactant-rich oil phase coexists with the surfactant-poor aqueous phase (Winsor II).
- Type III: a three-phase system where a surfactant-rich middle-phase coexists with both excess water and oil surfactant-poor phases (Winsor III or middle-phase microemulsion).
- Type IV: a single-phase (isotropic) micellar solution, that forms upon addition of a sufficient quantity of amphiphile (surfactant plus alcohol).

Reference: http at www.chm.bris.ac.uk/eastoe/Surf_Chem/3%20Microemulsions.pdf

Suitable treatment Fluids are described and claimed in the following documents:
- "Using Silicon Dioxide Nanoparticle Dispersions to Improve Oil Recovery", Filed Nov. 2, 2018 as U.S. patent application Ser. No. 16/179,676, describes and claims dispersions comprising silicon dioxide nanoparticles to improve oil recovery in underperforming wells.
- "Crude Oil Recover Chemical Fluids", filed Sep. 12, 2018 as U.S. patent application Ser. No. 16/129,688, and "Crude Oil Recover Chemical Fluid", filed Sep. 12, 2018 as U.S. patent application Ser. No. 16/129,705, both describe and claim treatment fluids containing colloidal silica nanoparticles that are used to improve recovery in underperforming wells.
- "Using Gases and Hydrocarbon Recovery Fluids Containing Nanoparticles to Enhance Hydrocarbon Recovery" was filed on Sep. 25, 2018 as U.S. patent application Ser. No. 16/141,824. This patent application describes and claims using treatment fluids containing nanoparticles in combination with gases to improve recovery in underperforming wells.
- "Brine Resistant Silica Sol" was filed on Apr. 5, 2018 as U.S. patent application Ser. No. 15/946,252 and published on Oct. 11, 2018 as US Patent Publication 2018/0291255. This patent application describes and claims colloidal silica that has been surface treated such that it demonstrates resistance to brine and thus remains functional and not gelled, even in the presence of significant amounts of salt in the well formation.
- "Hydrocarbon Formation Treatment Micellar Solutions" was filed on Apr. 5, 2018 as U.S. patent application Ser. No. 15/946,252 and published on Oct. 11, 2018 as US Patent Publication 2018/0291261. This patent application describes and claims the use of brine resistant colloidal silicas in hydrocarbon formation treatment micellar solutions.

U.S. patent application Ser. No. 16/179,676, U.S. patent application Ser. No. 16/129,688, U.S. patent application Ser. No. 16/129,705 U.S. patent application Ser. No. 16/141,824, US Patent Publication 2018/0291255 and Patent Publication 2018/0291261, all hereby incorporated by reference, in their entireties.

In an embodiment said treatment fluid comprises less than about 16.0 wt. % nanoparticles.

In an embodiment said treatment fluid comprises less than about 8.0 wt. % nanoparticles.

In an embodiment said treatment fluid comprises less than about 6.0 wt. % nanoparticles.

In an embodiment said treatment fluid comprises less than about 4.0 wt. % nanoparticles.

In an embodiment said treatment fluid comprises less than about 3.0 wt. % nanoparticles.

In an embodiment said treatment fluid comprises less than about 2.0 wt. % nanoparticles.

In an embodiment said treatment fluid comprises less than about 1.0 wt. % nanoparticles.

In an embodiment said treatment fluid comprises less than about 0.5 wt. % nanoparticles.

In an embodiment said treatment fluid comprises less than about 0.1 wt. % nanoparticles.

In an embodiment said treatment fluid comprises greater than about 0.05 wt. % nanoparticles.

In an embodiment said treatment fluid comprises greater than about 0.1 wt. % nanoparticles.

In an embodiment said treatment fluid comprises greater than about 0.50 wt. % nanoparticles.

In an embodiment said treatment fluid comprises greater than about 1.0 wt. % nanoparticles.

In an embodiment said treatment fluid comprises greater than about 2.0 wt. % nanoparticles.

In an embodiment said treatment fluid comprises greater than about 3.0 wt. % nanoparticles.

In an embodiment said treatment fluid comprises greater than about 4.0 wt. % nanoparticles.

In an embodiment said treatment fluid comprises greater than about 5.0 wt. % nanoparticles.

In an embodiment said treatment fluid comprises greater than about 6.0 wt. % nanoparticles.

In an embodiment said treatment fluid comprises greater than about 7.0 wt. % nanoparticles.

In an embodiment said treatment fluid comprises greater than about 8.0 wt. % nanoparticles.

In an embodiment said treatment fluid comprises greater than about 10.0 wt. % nanoparticles.

In an embodiment said treatment fluid comprises greater than about 12.0 wt. % nanoparticles.

Colloidal Silica Nanoparticles are commercially available from Nissan Chemical America Corporation. Brine Resistant Colloidal Silica Nanoparticles are commercially available from Nissan Chemical America Corporation. Brine Resistant Colloidal Silica Nanoparticles in combination with surfactants and optionally terpenes are commercially available from Nissan Chemical America Corporation under the tradename "nanoActiv® HRT and nanoActiv® EFT".

Brine Resistant Colloidal Silica

Colloidal silica is known to be electrostatically stabilized by surface charge, where like charges at the silica particle surface repel the like charges of other particles leading to a stable dispersion—this is part of the definition of a colloidal dispersion. In briny water, where the water/dispersant contains dissolved salt ions, colloidal particles experience a disruption or shielding of particle surface charge leading to a reduction in particle-to-particle repulsion and reduced colloidal stability.

It is known to surface-treat colloidal silica to try to avoid the loss of stability caused when the colloid encounters disruptive conditions, such as brine. However, it is known that some surface treated silica is more brine resistant than others.

With regards to brine resistance of colloidal silica, it is believed without being bound thereby, that the hydrophilicity/hydrophobicity balance of the surface treatment is important as well as the amount of surface treatment relative to the available silica surface area.

Organic surface treatment can improve colloidal silica stability in brine/high salinity water by addition of steric repulsion properties to supplement electrostatic repulsion between particles. Hydrophilic organic surface treatment is somewhat effective at adding this steric repulsion property for improved brine resistance. A combination of Hydrophilic and Hydrophobic surface treatment in the correct proportion can also form highly brine resistant surface treatment systems for colloidal silica—this is a necessity for the success of the described invention.

Adding some Hydrophobic character to colloidal silica is known in Organic solvent systems. However, it can be difficult to achieve in Aqueous systems. In short, Hydrophobic character by definition is water-hating and not prone to solubility or stability in water. It is desirable in this work to add organic surface treatment to colloidal silica having a combination of Hydrophilic and Hydrophobic character—where the silica has both excellent brine stability and the ability to perform well in removing oil from rock surfaces. Combining Hydrophilic and Hydrophobic character is well known in surfactant science but is not well known in organic surface treatment for colloidal silica.

Brine resistant silica sols and hydrocarbon recovery fluids comprising surface functionalized nanoparticles, where the surface functionalized nanoparticles are brine resistant silica sols, can be found in U.S. patent application Ser. No. 15/946,252; filed Apr. 5, 2018, published Oct. 11, 2018 as US Published Patent Application 2018/02912555. entitled "Brine Resistant Silica Sols"; U.S. patent application Ser. No. 15/946,338, filed Apr. 5, 2018, published Oct. 11, 2018 as US Published Patent Application 2018/0291261 entitled "Hydrocarbon Formation Treatment Micellar Solutions"; U.S. patent application Ser. No. 16/129,688; filed: Sep. 12, 2018, entitled "Crude Oil Recovery Chemical Fluids", which application claims priority to Japanese Patent Application No. JP 2017-175511; and U.S. patent application Ser. No. 16/129,705; filed: Sep. 12, 2018, entitled "Crude Oil Recovery Chemical Fluid", which application claims priority to Japanese Patent Application No. JP 2017-175511;

wherein as stated previously in this patent application, all of these US Patent Applications are herein incorporated by reference, in their entirety.

During the flowback/production phase, and as fluids flow out of the freshly fractured/re-fractured oil well to the surface, the fluids experience a decrease in temperature and pressure. The change in temperature and pressure conditions may cause several types of precipitation of dissolved species which may negatively affect the performance of the well.

In addition to providing paraffin and scale control an appropriately formulated nanoparticle-based fluid can aid in the flowback of desirable oil and gas. An appropriately formulated nanoparticle-based fluid can also effectively act as a friction reducing agent, which can be observed by a pressure drop during pumping when the particles are first pumped downhole as well as the reduced pressure required to produce oil from the treated well. This friction-reduction property can also be observed as a reduced need for artificial lift in a typical well where artificial lift is usually required.

This deliberate deposition of nanoparticles can also be applied to the induced fracture network within the formation, the secondary/existing fracture network within the formation, and the "tubulars" or piping that is used to conduct fluids up out of the formation to the surface.

Engineered nanoparticles are expected to reduce the tendency of high molecular weight hydrocarbons such as paraffin and scale to nucleate onto available surfaces and cause a reduction in recovery of desirable hydrocarbons.

It has been found that by preloading the "parent" (or initial) well with aqueous fluids containing brine resistant colloidal silica nanoparticles, available from Nissan Chemical America Corporation under the tradename nanoActiv® HRT or nanoActiv® EFT, several positive things occur. First, a general pressure barrier is built in the parent well that discourages interference from the offset ("child") well frac. Second, the nanoparticles in the preload fluid allow deeper penetration into the microfractures of the formation than would otherwise be possible. This effectively saturates or fluidizes the rock around the parent well and between the parent well and the offset frac well, further building a defense against offset frac pressure interference. This effect generally causes an improved fracturing of the offset well because the fracture pressure is better contained and the rock fractures more completely.

Recent field trials have showed that more than double the microfractures were created in the offset frac nearest to the parent preload, as compared to other offset wells on the same pad. Finally, with the nanoparticles and surfactant in both nanoActiv® HRT and nanoActiv® EFT doing their job in the formation around the parent preload well, when that parent well goes back on production, oil production is reached much quicker, in days or weeks as opposed to months, and levels of oil production return to, and in some cases, exceed pre-frac levels.

EXAMPLES

First Set of Three Trials

Here are descriptions of three trials—each with different methodology protocols.

All gallons listed are US gallons. The US gallon is defined as 231 cubic inches (4 US liquid quarts or 8 US liquid pints) or about 3.785 L.

There is a variation of concentration of Treatment Fluid 1 pumped in Well #1 and Well #3. For this work, the higher the concentration of treatment fluid is recommended as the amount of produced water is reduced.

Treatment Fluid 1 and Treatment Fluid 2 have essentially similar ingredients. The differences between the Treatment Fluids is the specific type of ingredient and the relative amounts of each ingredient in each Fluid.

Here is the list of ingredients present in each of Treatment Fluid 1 and Treatment Fluid 2.

Anionic surfactant

Nonionic surfactant

Amphoteric surfactant

Water soluble cosolvent

Water

Surface-modified, brine resistant silica

Micelles of disperses oil phase

Well #1:

Well #1 is located in Grady County, Oklahoma. It is preloaded with 4,410,000 gallons of produced water. Three point eight (3.8) gallons of treatment fluid one, nanoActiv® HRT, available from Nissan Chemical America Corporation, is pumped for every 1,000 gallons of produced water that is pumped as a preload, in multiple slugs, in the parent well.

During this trial, treatment fluid one is pumped in intermittent slugs throughout the duration of the preload pumping.

The results are shown below:

| Well # | Production Day | Monthly Oil (bbls) | Monthly Gas | Cumulative Oil (bbls) | Cumulative Gas | Avg Oil (bbls) | Avg Gas |
|---|---|---|---|---|---|---|---|
| 1 | Day Zero | 2492 | 17306 | 236007 | 1646325 | 80.39 | 558.26 |
| 1 | Day Thirty | 175 | 906 | 236182 | 1647231 | 5.83 | 30.20 |
| 1 | Day Sixty | 705 | 4876 | 236887 | 1652107 | 22.74 | 157.29 |
| 1 | Day Ninety | 1777 | 4960 | 238664 | 1657067 | 57.32 | 160.00 |
| 1 | Day One Twenty | 1649 | 6187 | 240313 | 1663254 | 58.89 | 220.96 |
| 1 | Day One Forty | 1651 | 5875 | 241964 | 1669129 | 53.26 | 189.52 |
| 1 | Day One Sixty | 2295 | 6245 | 244259 | 1675374 | 76.50 | 208.17 |
| 1 | Day One Eighty | 1763 | 7931 | 246022 | 1683305 | 56.87 | 255.84 |
| 1 | Day Two Hundred | 2492 | 9805 | 248514 | 1693110 | 83.07 | 326.83 |

Well #2:

Well #2 is located in Grady County, Oklahoma. One gallon of treatment fluid two, nanoActiv® EFT, available from Nissan Chemical America Corporation, is pumped for every 1,000 gallons of produced water that is pumped as a preload in the parent well. In this work, treatment fluid two is pumped steadily throughout the job.

The results are shown below:

| Well # | Production Day | Monthly Oil (bbbls) | Monthly Gas | Cum Oil (bbbls) | Cum Gas | Avg Oil (bbbls) | Avg Gas |
|---|---|---|---|---|---|---|---|
| 2 | Day Zero | 2374 | 13649 | 283432 | 1092075 | 76.58 | 440.29 |
| 2 | Day Thirty | 728 | 0 | 284160 | 1092075 | 23.48 | 0.00 |
| 2 | Day Sixty | 728 | 0 | 284888 | 1092075 | 23.48 | 0.00 |
| 2 | Day Ninety | 1094 | 1010 | 285982 | 1093085 | 39.07 | 36.07 |
| 2 | Day One Twenty | 2174 | 3174 | 288156 | 1096259 | 70.13 | 102.39 |
| 2 | Day One Fifty | 2394 | 4089 | 290550 | 1100348 | 79.80 | 136.30 |
| 2 | Day One Eighty | 2556 | 5731 | 293106 | 1106079 | 82.45 | 184.87 |
| 2 | Day Two Hundred Ten | 3180 | 6670 | 296286 | 1112749 | 106 | 222.33 |

Well #3

Well #1 is located in DeWitt County, Texas. Well #3 is preloaded with 840,000 gallons of produced water. Six gallons of treatment fluid one, nanoActiv® HRT, available from Nissan Chemical America Corporation, is pumped for every 1,000 gallons of produced water that is pumped as a preload in the parent well. Treatment fluid one is pumped in intermittent slugs throughout the duration of the preload pumping.

The results are shown below:

| Well # | Monthly Production Date | Monthly Oil (bubbles) | Monthly Gas | Monthly Water | Cumulative Oil (bubbles) | Cumulative Gas | Cumulative Water |
|---|---|---|---|---|---|---|---|
| 3 | Day Zero | 1530 | 0 | 290 | 231795 | 320589 | 160150 |
| 3 | Day Thirty | 1479 | 0 | 282 | 233274 | 320589 | 160432 |
| 3 | Day Sixty | 1436 | 0 | 275 | 234710 | 320589 | 160707 |
| 3 | Day Ninety | 1381 | 0 | 264 | 236091 | 320589 | 160971 |
| 3 | Day One Hundred Twenty | 1404 | 0 | 271 | 237495 | 320589 | 161242 |
| 3 | Day One Hundred Fifty | 1312 | 0 | 255 | 238807 | 320589 | 161497 |
| 3 | Day One Hundred Eighty | 1323 | 0 | 255 | 240130 | 320589 | 161752 |
| 3 | Day Two Hundred Ten | 1596 | 0 | 2468 | 241726 | 320589 | 164220 |
| 3 | Day Two Hundred Forty | 3893 | 1 | 6046 | 245619 | 320590 | 170266 |
| 3 | Day Two Hundred Seventy | 3441 | 1 | 5370 | 249060 | 320591 | 175636 |
| 3 | Day Three Hundred | 2543 | 0 | 3985 | 251603 | 320591 | 179621 |
| 3 | Day Three Hundred Thirty | 2364 | 0 | 3722 | 253967 | 320591 | 183343 |
| 3 | Day Three Hundred Sixty | 1955 | 0 | 3090 | 255922 | 320591 | 186433 |
| 3 | Day Three Hundred Ninety | 1863 | 0 | 2957 | 257785 | 320591 | 189390 |
| 3 | Day Four Hundred Twenty | 1728 | 0 | 2754 | 259513 | 320591 | 192144 |
| 3 | Day Four Hundred Fifty | 1537 | 0 | 2459 | 261050 | 320591 | 194603 |

| Well # | Monthly Production Date | Avg Oil (bbbls) | Avg Gas | Avg Water |
|---|---|---|---|---|
| 3 | Day Zero | 51 | 0 | 9.67 |
| 3 | Day Thirty | 47.71 | 0 | 9.1 |
| 3 | Day Sixty | 46.32 | 0 | 8.87 |
| 3 | Day Ninety | 46.03 | 0 | 8.8 |
| 3 | Day One Hundred Twenty | 45.29 | 0 | 8.74 |
| 3 | Day One Hundred Fifty | 43.73 | 0 | 8.5 |
| 3 | Day One Hundred Eighty | 42.68 | 0 | 8.23 |
| 3 | Day Two Hundred Ten | 51.48 | 0 | 79.61 |
| 3 | Day Two Hundred Forty | 139.04 | 0.04 | 215.93 |
| 3 | Day Two Hundred Seventy | 111 | 0.03 | 173.23 |
| 3 | Day Three Hundred | 84.77 | 0 | 132.83 |
| 3 | Day Three Hundred Thirty | 76.26 | 0 | 120.06 |
| 3 | Day Three Hundred Sixty | 65.17 | 0 | 103 |
| 3 | Day Three Hundred Ninety | 60.1 | 0 | 95.39 |

| Well # | Monthly Production Date | Avg Oil (bbbls) | Avg Gas | Avg Water |
|---|---|---|---|---|
| 3 | Day Four Hundred Twenty | 55.74 | 0 | 88.84 |
| 3 | Day Four Hundred Fifty | 51.23 | 0 | 81.97 |

Results of these trials indicated that either the level of production or days in production increased or both the level of production and days in production increased when the method of the instant claimed invention is followed.

Second Set of Five Trials

Commercially available nanoActiv® fluid comprising brine resistant colloidal silica has been pumped in various initial well pre-load jobs across the Eagle Ford, Anadarko and the Permian basins.

First Case Study-Three Trials

The first case study presented consists of a treatment of 5,000 gallons of nanoActiv® injected as smaller volume pills throughout the initial well pre-load for a well in Dewitt County in the Eagle Ford. The treatment was allowed to soak for approximately 2.5 weeks during the infill well work to allow the nanoparticles in nanoActiv® to diffuse out into the reservoir, and to alter the wettability of the formation to create more favorable fluid-flow conditions.

Figure 6:
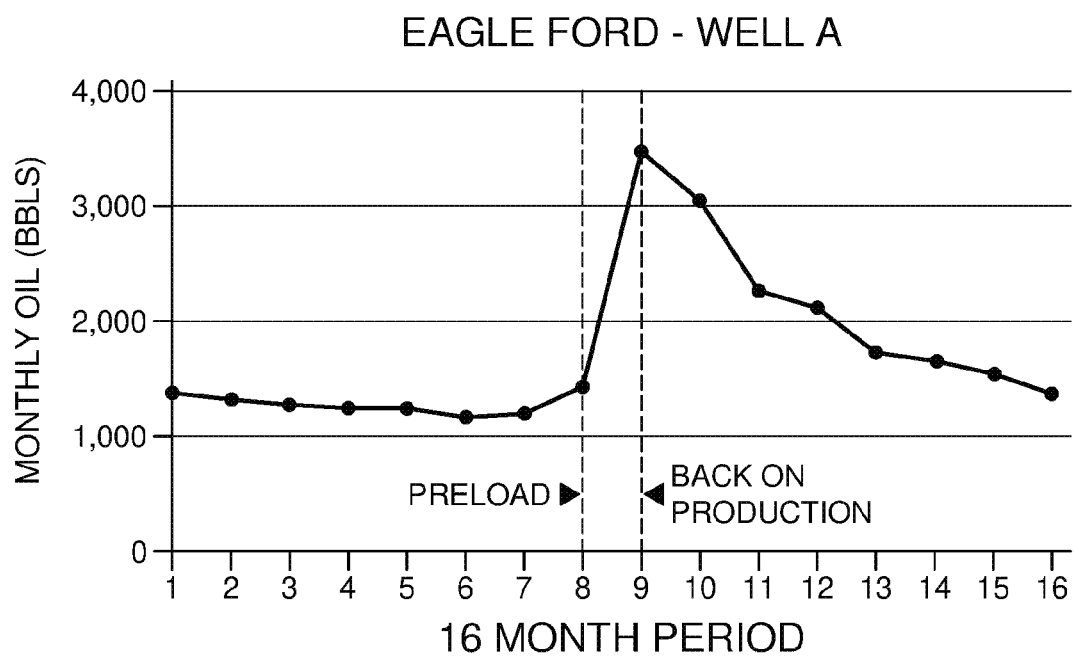
FIG. 6: Shows Monthly Oil production for Eagle Ford—Well A, in bbls (barrels, each barrel of oil in US or Canada contains 159 liters, which are equivalent to 42 US gallons) vs. time, with the production line showing the effect of the well being treated with 5000 gallons (US) of nanoActiv® fluids comprising silica nanoparticles.

For Eagle Ford-Well A, see FIG. 6, a significant increase in monthly oil production has been observed post-treatment where the pre-load treatment has surpassed the previous production rate for more than 6 months.

Figure 7:
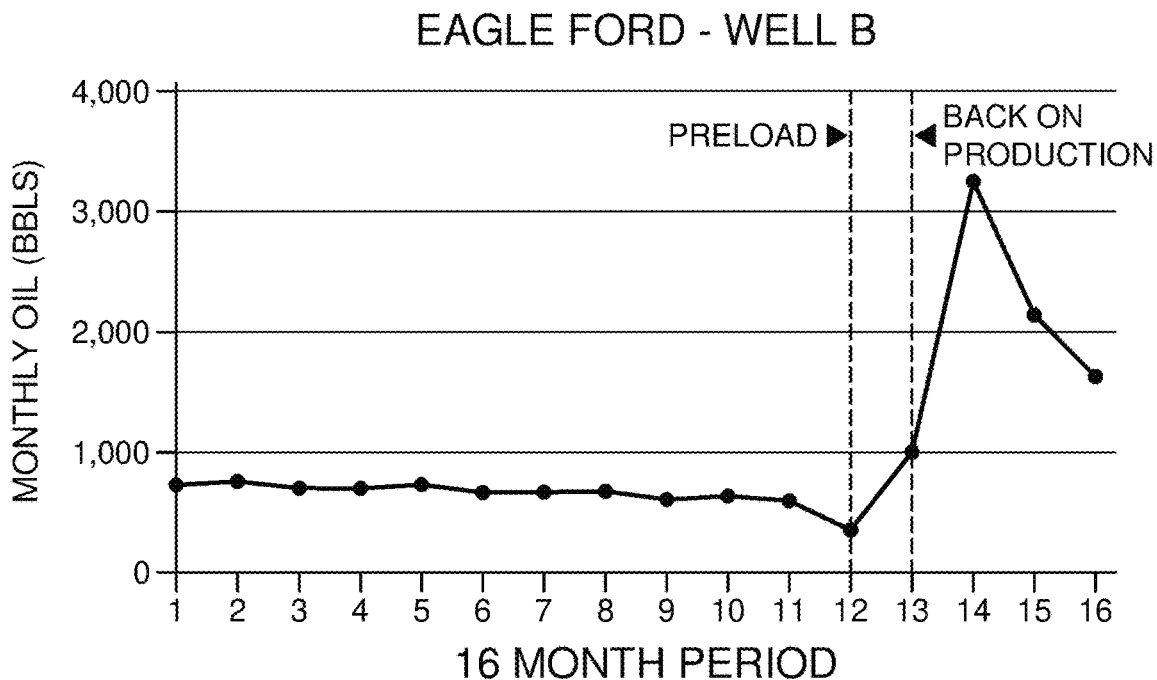
FIG. 7: Shows Monthly Oil production for Eagle Ford—Well B, in bbls (barrels, each barrel of oil in US or Canada contains 159 liters, which are equivalent to 42 US gallons) vs. time, with the production line showing the effect of the well being treated with 5000 gallons (US) of nanoActiv® fluid comprising silica nanoparticles.

Eagle Ford-Well B, see FIG. 7, shows the case history of the second initial well pre-load treatment using nanoActiv® in Dewitt County in the Eagle Ford. Again, 5,000 gallons were used for the treatment, with a soak time of approximately 2.5 weeks. A significant increase in production can be seen for up to four months post-treatment.

Figure 8:
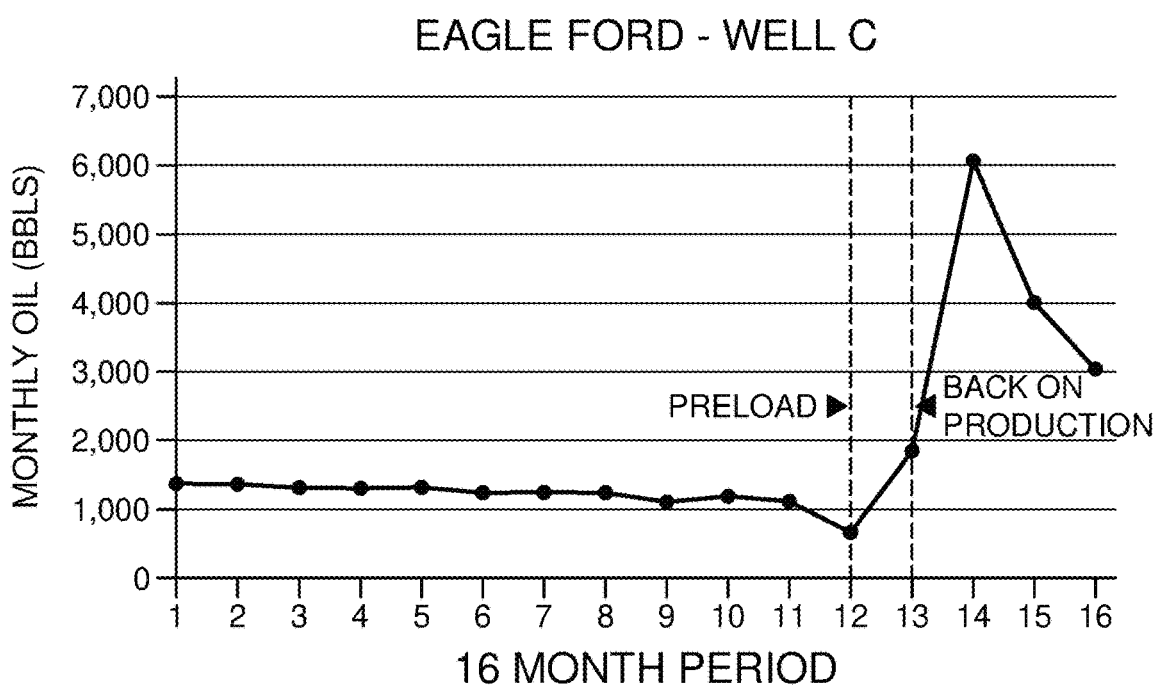
FIG. 8: Shows Monthly Oil production for Eagle Ford—Well C, in bbls (barrels, each barrel of oil in US or Canada contains 159 liters, which are equivalent to 42 US gallons) vs. time, with the production line showing the effect of the well being treated with 2500 gallons (US) of nanoActiv® fluid comprising silica nanoparticles.

Eagle Ford-Well C, see FIG. 8, shows production data from a third well in Dewitt County, TX, in the Eagle Ford. For this well, 2,500 gallons of nanoActiv® pills were injected throughout the initial well pre-load with a similar soak time as stated above. Similarly, to Well B, a significant increase in production can be seen for up to four months post-treatment.

On average, initial well production was returning to only 65% of Barrel of Oil Per Day ("BOPD") prior to the offset fracture interference. With the nanoActiv® preloads the operator of the well during the trials observed initial wells surpass previous production rates.

Second Case Study-Two Trials

Figure 9:
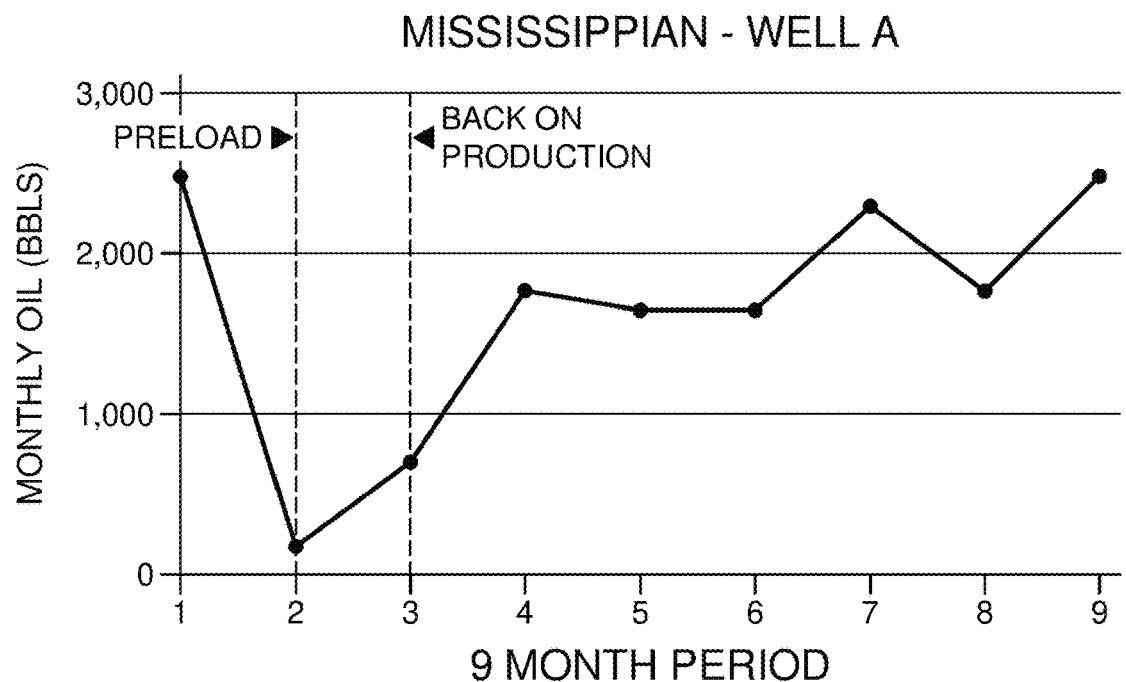
FIG. 9: Shows Monthly Oil production for Mississippian-Well A, in bbls (barrels, each barrel of oil in US or Canada contains 159 liters, which are equivalent to 42 US gallons) vs. time, with the production line showing the effect of the well being treated with 17,000 gallons (US) of nanoActiv® fluid comprising silica nanoparticles.

The second case study presented shows the production data for two wells in Grady County, OK, in the Mississippian formation in the Anandarko Basin. Mississippian—Well A, see FIG. 9, consisted of a 17,000-gallon treatment of nanoActiv® HRT pills pumped intermittently throughout the initial well pre-load. The production data trend seems to demonstrate an almost reversal trend in the production losses caused by the frac hit after treatment with nanoActiv®.

Figure 10:
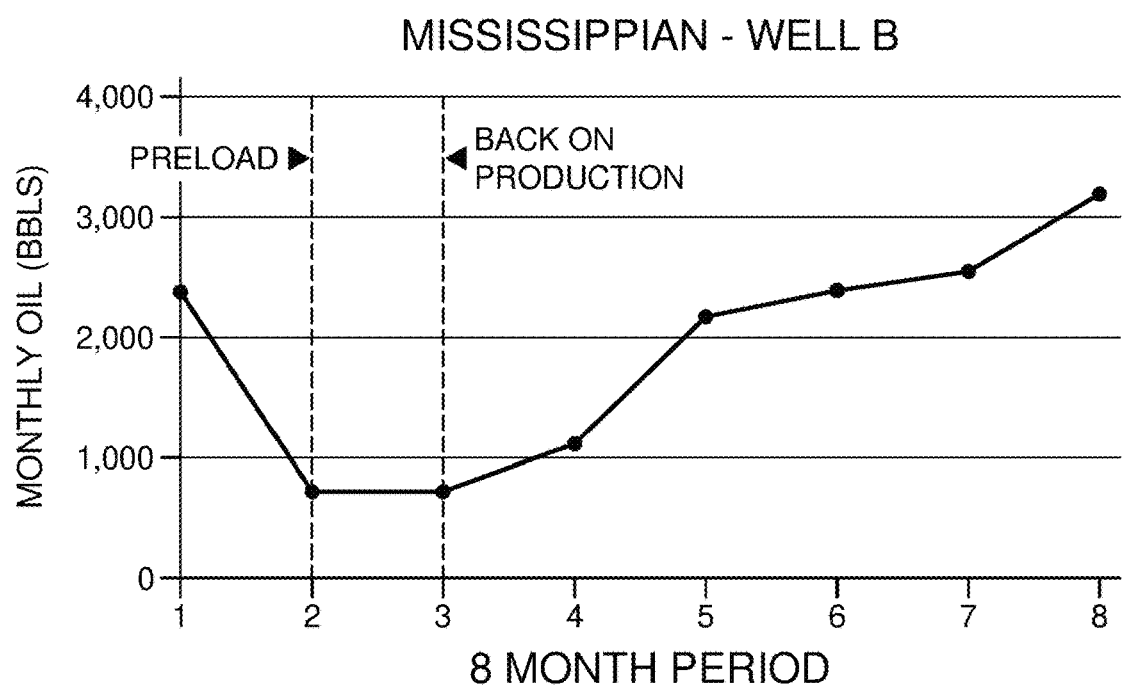
FIG. 10: Shows Monthly Oil production for Mississippian-Well B, in bbls (barrels, each barrel of oil in US or Canada contains 159 liters, which are equivalent to 42 US gallons) vs. time, with the production line showing the effect of the well being treated with 4,500 gallons (US) of nanoActiv® fluid comprising silica nanoparticles.

A very similar trend is observed in Mississippian—Well B, see FIG. 10, also in the Mississippian formation where the treatment volume of nanoActiv® was only 4,500 gallons nanoActiv® EFT pumped throughout the preload job with an approximately 2.5 weeks soak time.

What is claimed:

1. A method for minimizing the creation and existence of frac hits in an oil field comprising the step of pumping treatment fluids into the parent well before performing the frac on the child well wherein the treatment fluid comprises colloidal silica nanoparticles which are surface modified with an organosilane selected from methyltrimethoxysilane, methyltriethoxysilane, ethyltrimethoxysilane, methyltriethoxysilane, n-propyltrimethoxysilane, n-propyltriethoxysilane, isopropyltrimethoxysilane, isopropyltriethoxysilane, butyltrimethoxysilane, butyltriethoxysilane, hexyltrimethoxysilane, octyltrimethoxysilane, 3-mercaptopropyltrimethoxysilane, phenyltrimethoxysilane, glycidoxypropyltrimethoxysilane, methacryloxypropyltrimethoxysilane, methacryloxypropyltriethoxysilane, 3-ethyl-3-oxetanyloxymethylpropyltrimethoxysilane, vinyltrimethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltriphenoxysilane, vinyltri(t-butoxy)silane, vinyltris (isobutoxy)silane, vinyltris(isopropenoxy)silane, vinyltris (2-methoxyethoxy)silane, (3-triethoxysilyl)propylsuccinic anhydride, trialkoxyarylsilanes, isooctyltrimethoxysilane, N-(3-triethoxysilylpropyl)methoxyethoxy ethyl carbamate, N-(3-triethoxysilylpropyl)methoxyethoxyethoxyethyl carbamate, ureidopropyltrimethoxysilane, 3-acryloyloxypropyltrimethoxysilane, and combinations thereof.

2. The method of claim 1 wherein said colloidal silica nanoparticles are brine resistant colloidal silica nanoparticles.

3. The method of claim 1 wherein said treatment fluid comprises brine resistant colloidal silica nanoparticles and surfactants and optionally one or more terpenes.

4. The method of claim 1 wherein said treatment fluid comprises less than 16.0 wt. % nanoparticles.

5. The method of claim 1 wherein said treatment fluid comprises greater than 0.05 wt. % nanoparticles.

6. The method of claim 1 wherein said treatment fluid comprises less than 8.0 wt. % nanoparticles.

7. The method of claim 1 wherein said treatment fluid comprises greater than 1.0 wt. % nanoparticles.

8. The method of claim 1 wherein said treatment fluid comprises less than 4.0 wt. % nanoparticles.

9. The method of claim 1 wherein said treatment fluid comprises greater than 2.0 wt. % nanoparticles.

\* \* \* \* \*